W. R. McCULLA.
ENGINE TESTING APPARATUS.
APPLICATION FILED FEB. 4, 1918.
1,427,218.
Patented Aug. 29, 1922.
9 SHEETS—SHEET 4.
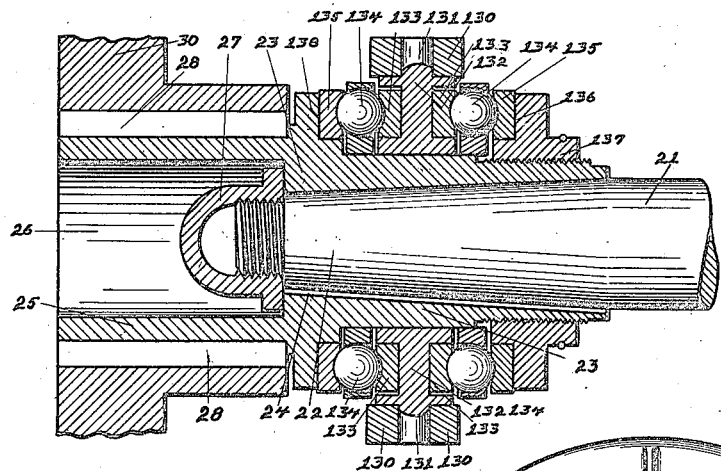
Fig. VI.
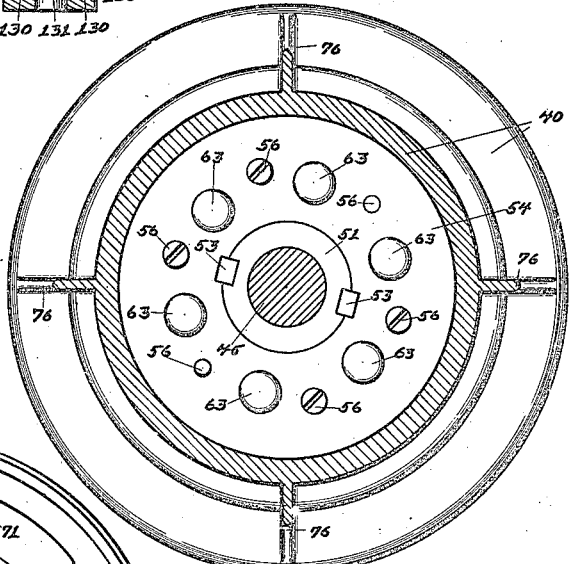
Fig. VII.
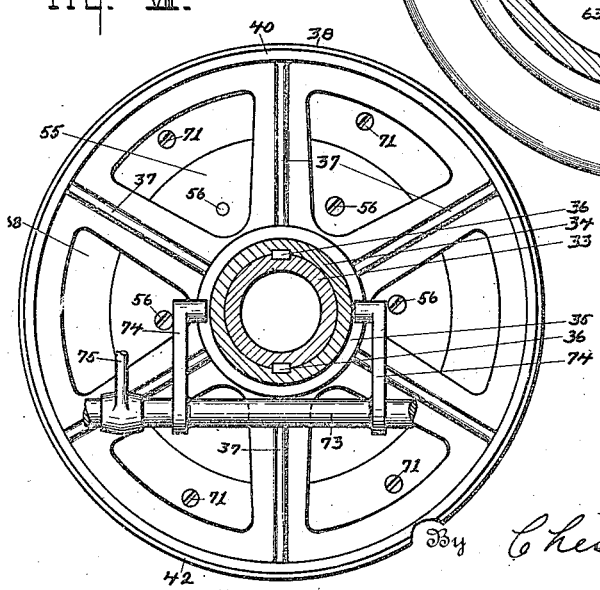
Fig. VIII.
Inventor
William R. McCulla
By Chester H Braselton
Attorney

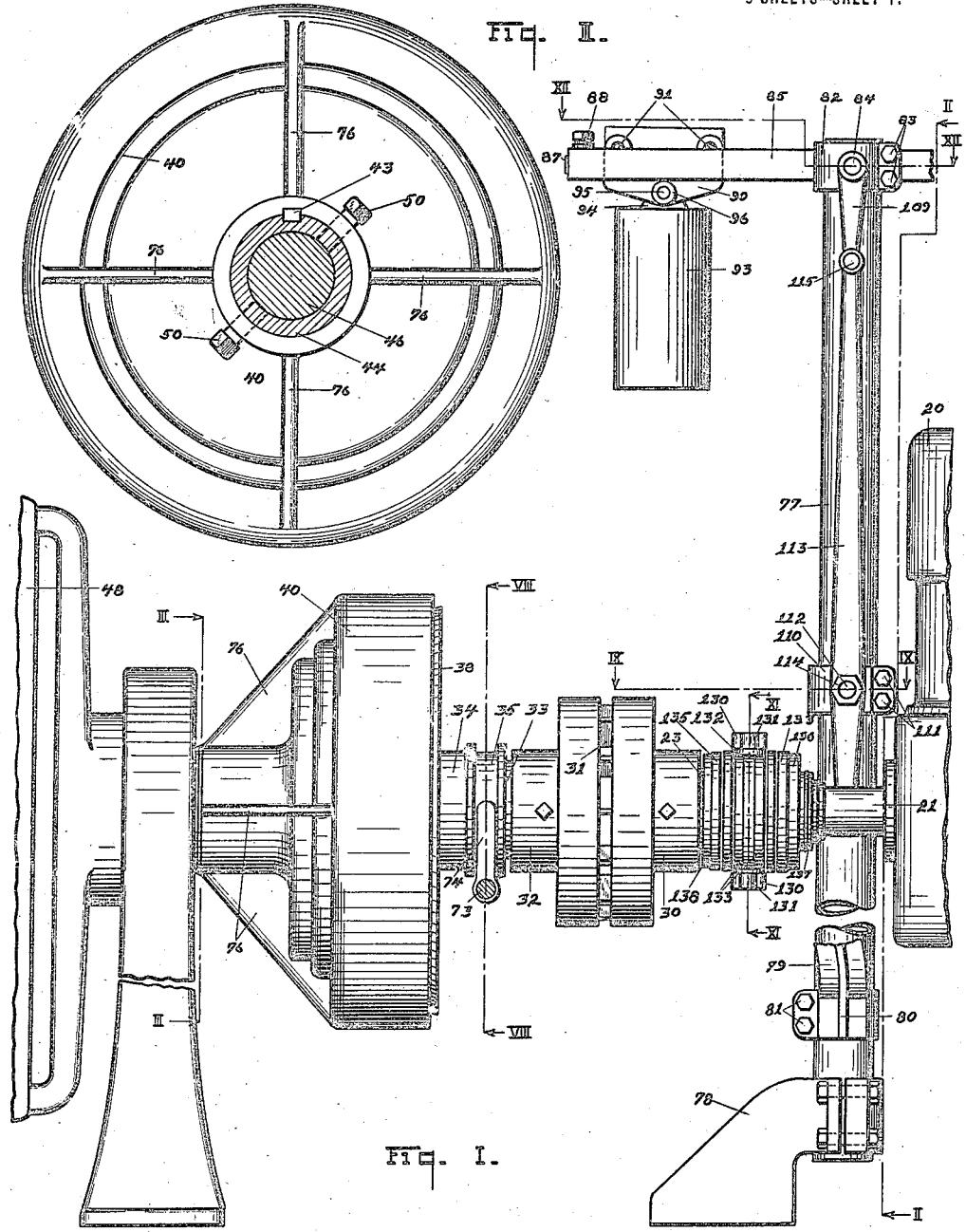

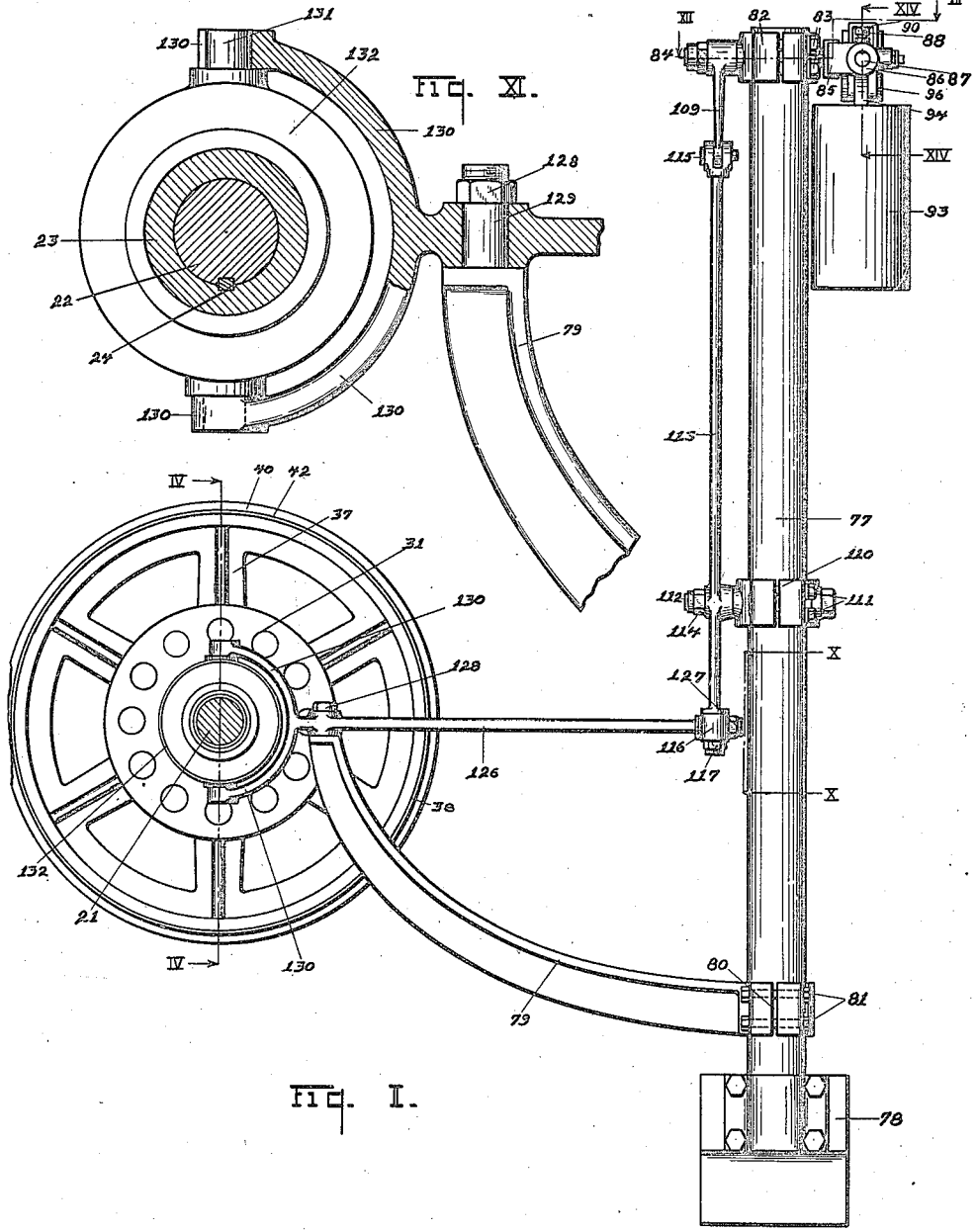

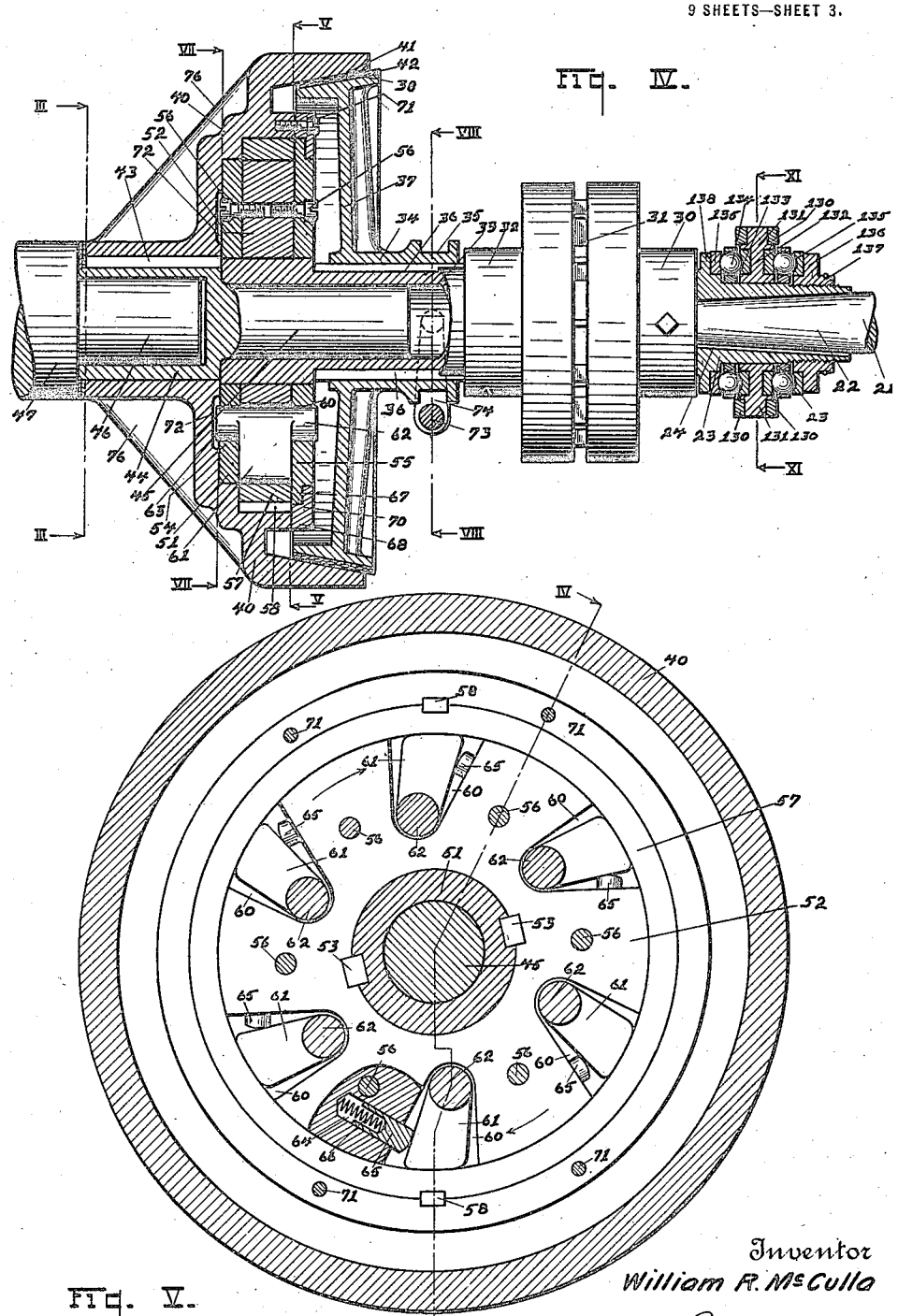

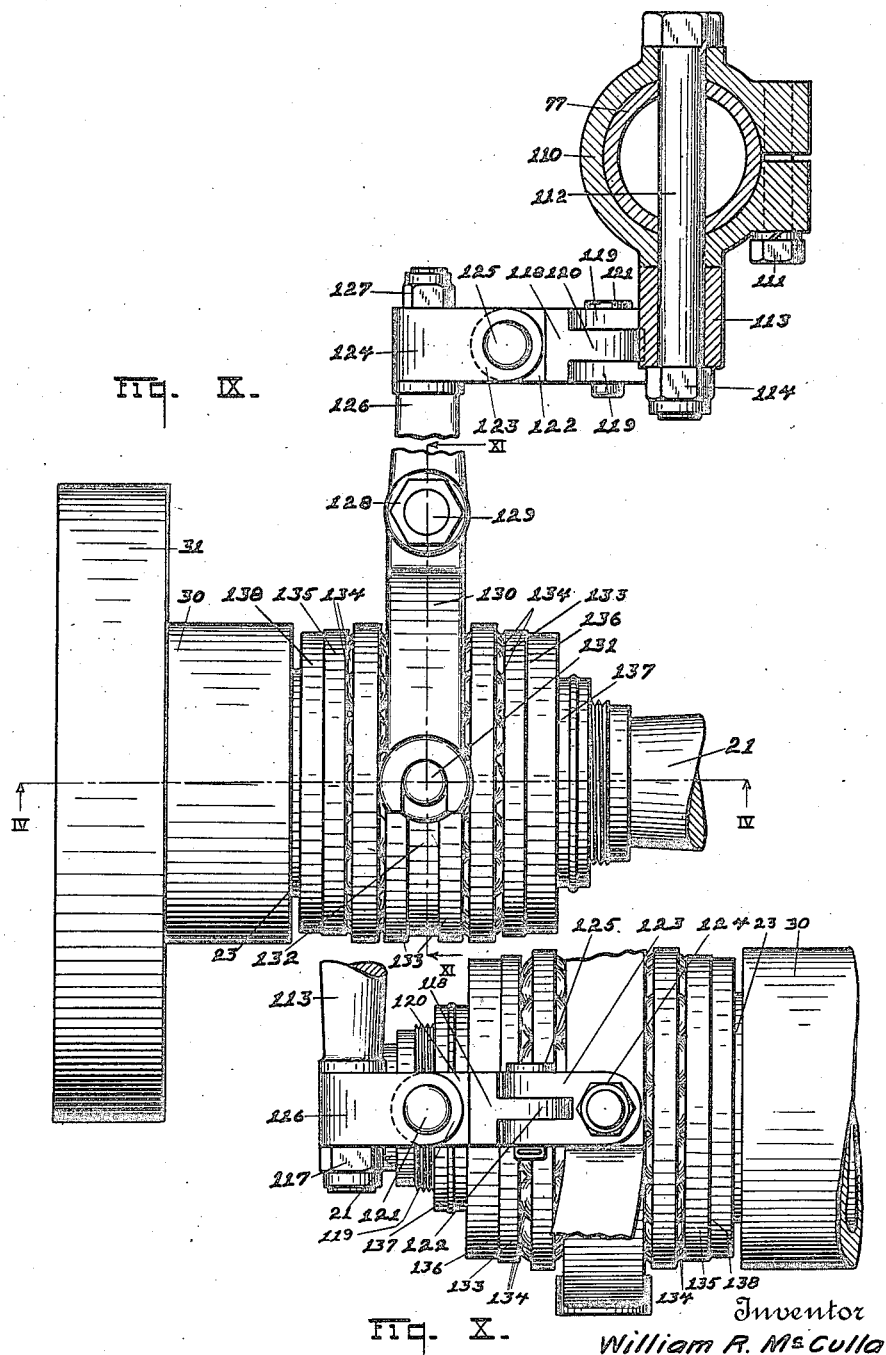

W. R. McCULLA.
ENGINE TESTING APPARATUS.
APPLICATION FILED FEB. 4, 1918.
1,427,218.
Patented Aug. 29, 1922.
9 SHEETS—SHEET 6.
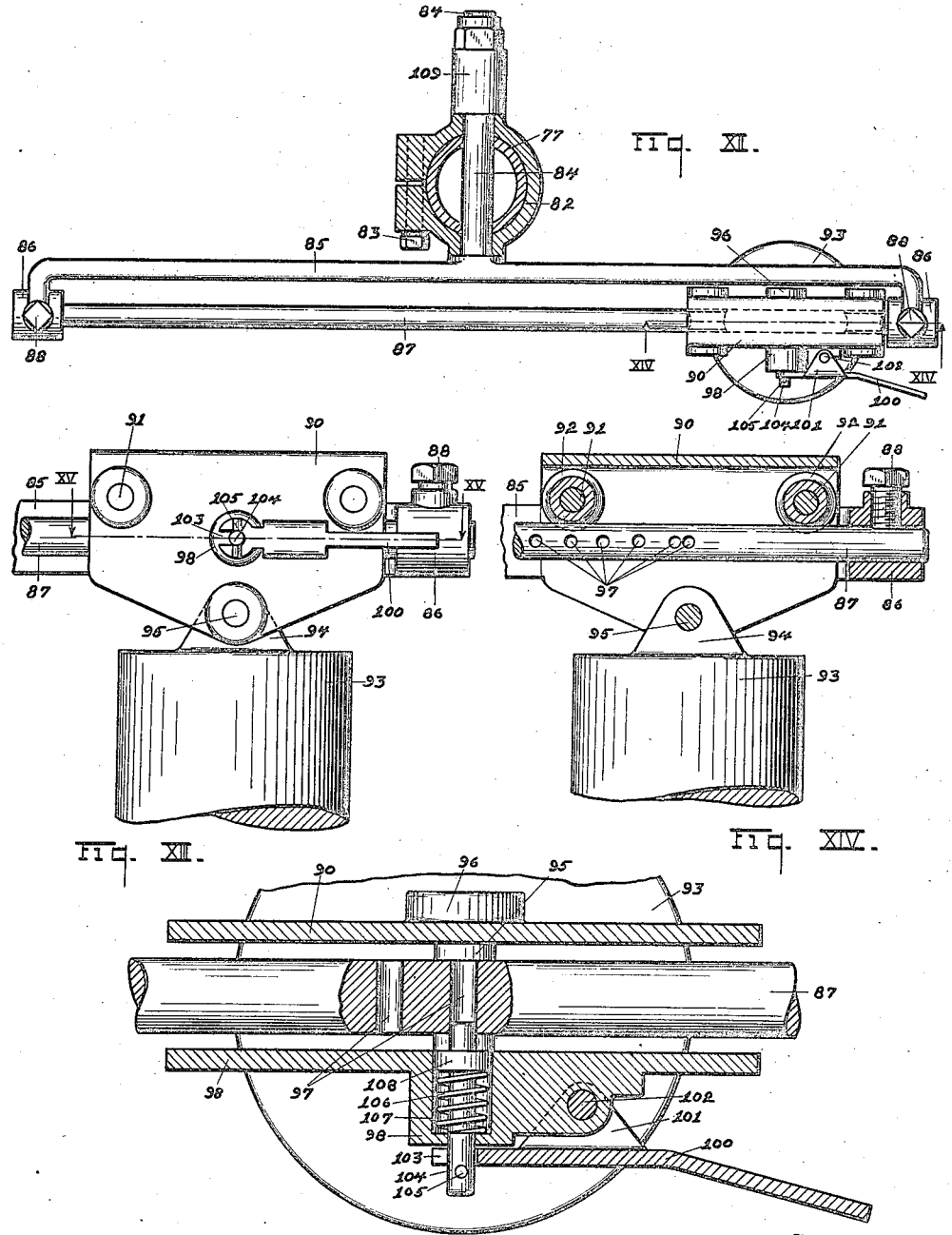
Inventor
William R. McCulla
By Chester H Braselton
Attorney

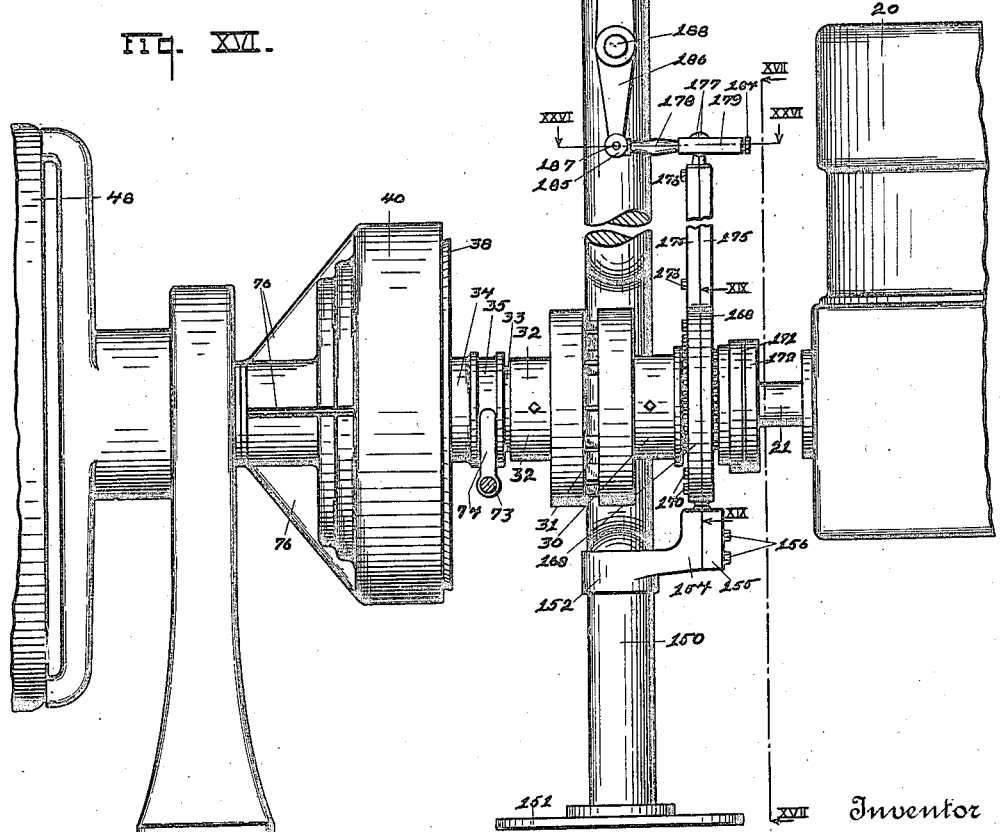

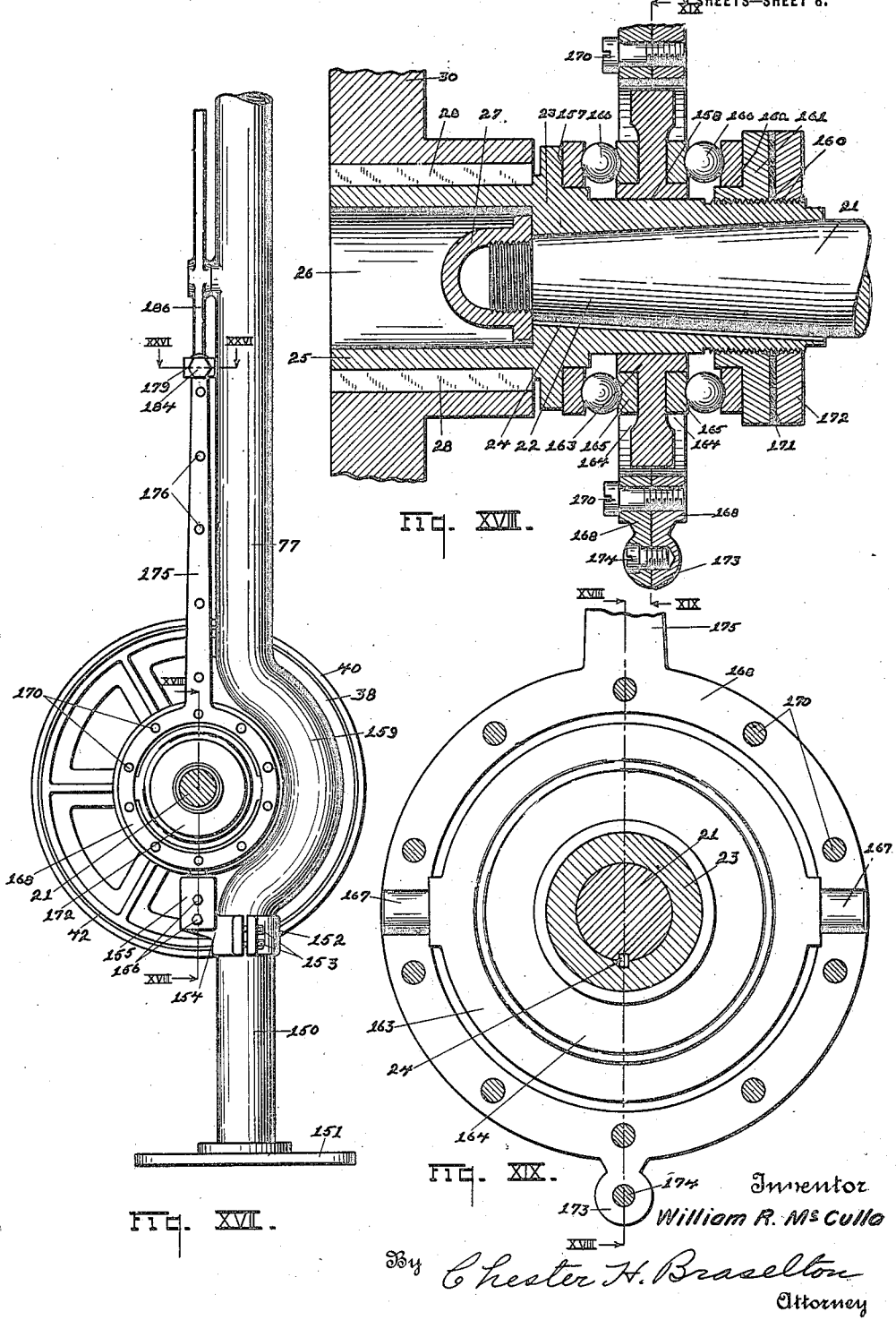

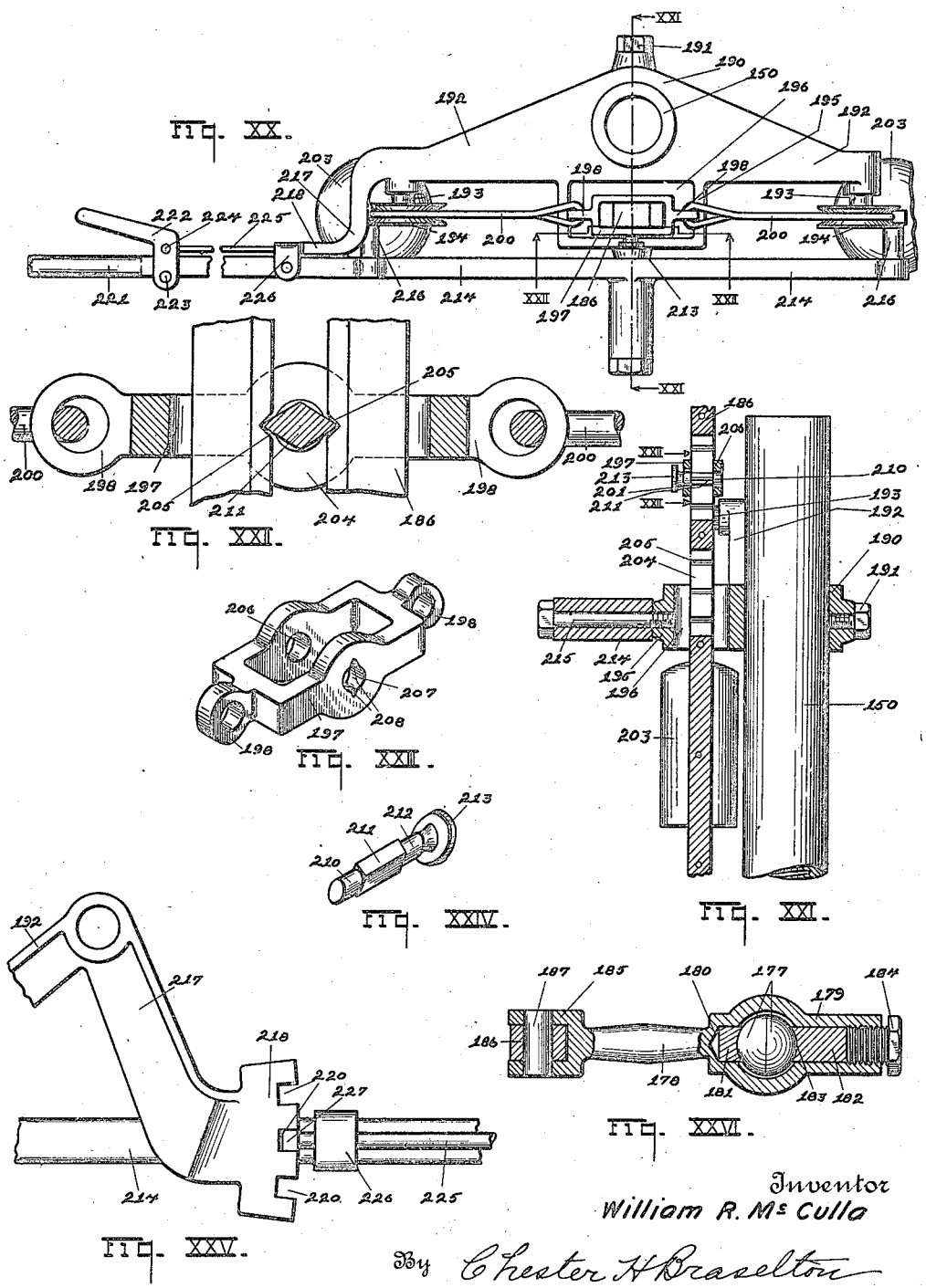

UNITED STATES PATENT OFFICE.

WILLIAM R. McCULLA, OF TOLEDO, OHIO, ASSIGNOR TO THE WILLYS-OVERLAND COMPANY, OF TOLEDO, OHIO, A CORPORATION OF OHIO.

ENGINE-TESTING APPARATUS.

1,427,218.           Specification of Letters Patent.      Patented Aug. 29, 1922.

Application filed February 4, 1918. Serial No. 215,415.

*To all whom it may concern:*

Be it known that I, WILLIAM R. MC-CULLA, a citizen of the United States, residing at Toledo, in the county of Lucas and State of Ohio, have invented certain new and useful Improvements in Engine-Testing Apparatus, of which I declare the following to be a full, clear, and exact description.

This invention relates to improvements in engine testing apparatus, and more particularly to apparatus for testing engines in which the power of the engine is determined by driving a dynamo therefrom, the dynamo being so calibrated that the current generated thereby during a given period will determine the power of the engine.

In the testing of internal combustion engines for use in aeroplanes, it is essential that the test should be conducted with a certain thrust of known value impressed upon the shaft of the internal combustion engine. Aeroplanes are of two types, in one of which, called the pusher type, the propeller thrust acts on the shaft of the engine in a direction from the propeller to the engine, whereas in the other type, known as the tractor type, the propeller thrust acts on the shaft of the engine in a direction from the engine towards the propeller. It is therefore desirable, in providing an apparatus for testing aeroplane engines, that the apparatus be such that a thrust of known value may be impressed upon the propeller shaft in either direction, that is to say, either in a direction toward the engine or in a direction away from the engine.

The principal object of my invention is to provide an apparatus for testing engines, in which means are provided for impressing a thrust of a predetermined value on the shaft of the engine being tested. A further object is to provide such an apparatus, in which means are provided for varying the amount of the thrust impressed upon the shaft of the engine. Still a further object of my invention is to provide means for reversing the direction of the thrust, which is impressed upon the shaft of the engine being tested.

Further objects, and objects relating to economies of manufacture and details of construction, will definitely appear from the detailed description to follow.

I accomplish the objects of my invention by the devices and means described in the following specification. My invention is clearly defined and pointed out in the appended claims.

A structure constituting a preferred embodiment of my invention is illustrated in the accompanying drawing, forming a part of this specification, in which—

Fig. I is a view in side elevation of an apparatus embodying my invention.

Fig. II is a view, partly in side elevation and partly in section, taken on the line II—II of Fig. I.

Fig. III is a sectional view taken on the line III—III of Figs. I and IV, and illustrating an over-running clutch embodied in this apparatus.

Fig. IV is a detail, sectional view taken on the line IV—IV of Figs. II, V and IX.

Fig. V is a detail, sectional view, taken substantially on the line V—V of Fig. IV.

Fig. VI is a detail, fragmentary, sectional view, corresponding to a part of Fig. IV, with the hub of the universal joint being shown in section.

Fig. VII is a detail, sectional view, taken substantially on the line VII—VII of Fig. IV.

Fig. VIII is a detail, sectional view, taken substantially on the line VIII—VIII of Figs. I and IV.

Fig. IX is a sectional, plan view, taken substantially on the line IX—IX of Fig. I.

Fig. X is a sectional, elevational view, taken substantially on the line X—X of Fig. II.

Fig. XI is a fragmentary, sectional view, taken substantially on the line XI—XI of Figs. I and IX.

Fig. XII is a sectional, plan view, taken substantially on the line XII—XII of Figs. I and II.

Fig. XIII is a fragmentary, side elevational view of a part of the weight supporting member.

Fig. XIV is a detail, sectional view, taken substantially on the line XIV—XIV of Figs. II and XII.

Fig. XV is a detail, sectional view, taken substantially on the line XV—XV of Fig. XIII.

Fig. XVI is a view in side elevation of a modified form of my invention.

Fig. XVII is a sectional, elevational view, taken substantially on the line XVII—XVII of Fig. XVI.

Fig. XVIII is a detail, sectional view taken substantially on the line XVIII—XVIII of Figs. XVII and XIX.

Fig. XIX is a sectional view, taken substantially on the line XIX—XIX of Figs. XVI and XVIII, and, Fig. XX is a fragmentary top plan view of the weight supporting parts of this apparatus.

Fig. XXI is a detail, sectional view, taken substantially on the line XXI—XXI of Figs. XVI and XX.

Fig. XXII is a detail, sectional view, taken substantially on the line XXII—XXII of Figs. XX and XXI.

Fig. XXIII is a detail, perspective view of the yoke embracing the upper end of the lever.

Fig. XXIV is a detail, perspective view of the pin for connecting the yoke to the lever.

Fig. XXV is a fragmentary, detail view, in side elevation, illustrating the detent for the weight actuating lever, and Fig. XXVI is a detail, sectional view, taken substantially on the line XXVI—XXVI of Figs. XVI and XVII.

In the drawings, similar reference numerals refer to similar parts throughout the several views, and the sectional views are taken looking in the direction of the little arrows at the ends of the section lines.

My invention comprises generally a dynamo and an engine, and driving connections between the crank shaft of the engine and the dynamo, comprising an over-running clutch and a universal joint. A member is mounted on the crank shaft of the engine, having opposed abutments, and a thrust ring is mounted between said abutments and connected with a system of levers, so that a thrust of a predetermined value may be impressed upon said ring, either in a direction toward the engine or away from the engine, and longitudinally of the engine shaft. This system of levers is connected with a weight, so that, since the length of the lever arms is constant and known, and the value of the weight is known, the value of the thrust impressed by the system of levers upon the thrust ring may be accurately predetermined, and may be varied by shifting the weight in its support, so as to change the length of the lever arm, to which the weight is connected. The direction, in which the thrust is exerted, may be varied by shifting the weight from one side of the fulcrum to the other, so as to cause the weight to act in a reverse direction upon the system of levers.

Considering the numbered parts of the drawing, I have shown an internal combustion engine 20 provided with a crank shaft 21. The forward end of the crank shaft 21 is tapered, as at 22, and a member 23 is mounted on the tapered end of the crank shaft, being non-rotatably connected thereto by means of a spline 24. The member 23 has the portion 25 extending beyond the crank shaft 21 and this part 25 is provided with an internal recess 26, in which is disposed the nut 27 threaded on the ends of the crank shaft 21, and retaining the member 23 on said crank shaft. Hub 30 of the universal joint 31 is secured to the cylindrical portion 25 of the member 23 by means of the splines 28. The hub 32 of the universal joint 31 is secured to the shaft 33. Hub 34 of the male clutch member 37 is mounted on shaft 33, so as to slide thereon, being compelled to rotate with said shaft by means of the splines 36. A groove 35 is formed in the hub 34, and is adapted to be engaged by a clutch yoke so as to move the male clutch member on the shaft 33. Said male clutch member is provided with the rim 38, which is adapted to engage the complementary portion 41 of the female clutch member 40. A strip 42 of friction material is fixed to the rim 38 of the male clutch member 37. The hub of the female clutch member 40 is keyed to the shaft 44 by means of the spline 43, said shaft 44 being provided with an opening in the central part thereof, in which is mounted the stub shaft 46 extending from the shaft 47 of the dynamo 48 and being secured thereto by the set screws 50. Shaft 44 is provided with the extension 45, which is mounted and rotates within the hollow shaft 33, upon which the hub of the male clutch is mounted.

Said shaft 33 is provided with the enlarged cylindrical portion 51, on which the disc 52 is mounted, being connected thereto by means of the keys 53. The circular plates 54 and 55 are secured to the respective faces of the disc 52 by means of the screws 56. A ring 57 is mounted within the female clutch member 40 and connected thereto by means of the keys 58, said ring being in line with the disc 52. The disc 52 is provided with a plurality of notches 60, in which are mounted the dogs 61. Said dogs are provided with the laterally extending trunnions 62 and 63, which are journalled in openings in the plates 55 and 54, respectively, as is clearly shown in Fig. IV of the drawing. A plurality of sockets 64 are provided in the disc 52, one of said sockets opening into each of the notches 60 in the disc, and plungers 65 are slidably mounted in the sockets 64, with the head of each of said plungers engaging the side of one of the dogs 61. A spring 66 is compressed between the base of each plunger 65 and the bottom of the socket 64, so as to normally press the plunger outwardly against the dog 61. The plate 55 is provided with a peripheral shoulder 67, and a ring 68 is secured to the female clutch member 40 by means of the screws 71 and is provided with a projecting flange 70, engaging the shoulder 67 of the plate 55. A recess 72 is provided in the female clutch member 40 to accommodate the heads of the screws 56, as shown in Fig. IV of the drawing.

A clutch yoke comprising the arms 74, having laterally extending fingers fitting in the groove 35, is mounted on the rock shaft 73, and adapted to be operated by means of the lever 75, so as to move the male clutch member 37 into engagement with the female clutch member 40, in the usual manner. The female clutch member 40 is provided with a number of strengthening webs or ribs 76, as is shown in Figs. I and IV of the drawing.

A post 77 is mounted on the base 78 and extends vertically at one side of the crank shaft 21 and adjacent to the engine 20. An arm 79 is provided, having a split hub 80, which embraces the post 77, and the parts of which are drawn together by means of the bolts 81. The arm 79 extends from the post 77 laterally and upwardly, as shown in Fig. II of the drawing. A split sleeve 82 embraces the upper end of the post 77, the parts of said sleeve being drawn together by means of the bolts 83. A pin 84 extends through the sleeve 82 and through the post 77, as shown in Fig. XII, and carries at one end a bar 85, which extends in a direction transverse to that of the pin 84, the ends of said bar being turned laterally and carrying the heads 86. A rod 87 has its ends mounted in the head 86 and secured thereto by means of the set screws 88.

Yoke 90 is mounted embracing the rod 87, as is clearly shown in Figs. XII and XIV, and said yoke carries a pair of pins 91, mounted in the side walls of the yoke, on which the rollers 92 are journalled, said rollers running on the rod 87, so that the yoke 90 is mounted so as to travel on the rod 87 from one end thereof to the other. A weight 93 has an upwardly extending tongue 94 thereon, which extends between the two side walls of the yoke and is connected thereto by means of the pin 95 passing transversely through the lower portions of the side walls of the yoke and through the tongue 94.

A plurality of transverse openings 97 are provided in the rod 87. A boss 98 is formed on one side wall of the yoke 90, and forms a housing for a detent plunger, which is adapted to work in any one of the openings 97 and lock the yoke against movement relative to the rod 87. A plunger 104 is slidably mounted in an opening formed in the boss 98, and has an enlarged annular flange working in the chamber 107 in said boss. A spring 106 is compressed around the plunger 104, between the flange 108 and the base of the chamber 107 in the boss 98. A lever 100 is provided with a pair of laterally extending ears 101, by means of which the lever is fulcrumed on the boss 98, with the pin 102 extending through the boss and through the ears 101. The end of the lever 100 is forked at 103 and extends around the projecting end of the plunger 104. A pin 105 extends through the end of the plunger 104, so that the plunger 104 works in any one of the openings 97 and may be released therefrom by depressing the lever 100, so as to withdraw the plunger and permit the yoke to be moved relative to the rod 87.

A lever arm 109 is mounted on the pin 84, on the side of the sleeve 82 opposite to the rack 85. The lower end of the arm 109 is pivotally connected by the pin 115 to the upper end of a lever 113, which is fulcrumed on the pin 112, which extends through the post 77 and through a split sleeve 110, carried by said post, the parts of said sleeve being drawn together by the bolts 111. The nut 114 holds the lever 113 on the pin 112, as is clearly shown in Fig. IX of the drawing. A coupling member 116 is mounted on the lower end of the lever 113, being held in place thereon by means of the nut 117, threaded on the lower end of the lever 113. The coupling member 116 is provided with the laterally projecting ears 119. A second coupling member 118 has the laterally projecting tongue 120, which extends between the ears 119, of the coupling member 116 and is pivotally connected thereto by means of the horizontally extending pin 121. Coupling member 118 has the tongue 122 extending between the ears 123 of the coupling member 124, which is mounted on one end of the lever 126, being retained in place thereon by the nut 127 threaded on the end of the lever 126. The coupling member 124 is pivotally connected to the member 118 by the vertically extending pin 125. The arm 79, which, as I have heretofore pointed out, extends laterally and upwardly from the post 77, is provided with a stud 129 at its upper end, on which the lever 126 is fulcrumed, said lever being retained in place thereon by the nut 128, threaded on the upper end of the stud 129. The end of the lever 126, which is adjacent to the engine shaft, is forked, being provided with the arms 130, the ends of which embrace the pins 131 extending from the thrust ring 132 at diametrically opposite points thereof.

The member 23, which is fastened on the crankshaft 21, is provided with the annular shoulder 138, which faces rearwardly towards the engine. An annular thrust bearing is provided, having a ring 135, which abuts the shoulder 138. The thrust ring 132 is mounted on the member 23, and has a recess on each side thereof. The recess opposed to the shoulder 138 receives the bearing ring 133, which is complementary to the bearing ring 135 and the balls 134 run in opposed races in the bearing rings 133 and 135, in the usual manner. A member 137 is threaded on the member 23 and provided with a shoulder 136, which faces the shoulder 138. The bearing ring 135 of an annular thrust bearing abuts against the shoulder 136, and the opposite bearing similar in all respects to the bearing described above ring 133 of said thrust bearing fits in the recess provided in the opposite side of the thrust ring 132 from that contacting with the thrust ring 133 previously described, the balls 134 being disposed between the bearing rings 133 and 135 and running in races provided therein.

It will be seen from this that the shoulder 138 on the member 23 and the shoulder 136 provided on the sleeve 137 form opposed annular shoulders or abutments, which are fixed to and rotated with and are in effect an integral part of the engine shaft. The two thrust bearings are mounted between said shoulders, each of said bearings abutting one of said shoulders, and the thrust ring is mounted on the member 23 between the two bearings, and in such a way that if a thrust is applied to the thrust ring, in the direction of the engine shaft, such thrust will be transmitted through one of the thrust bearings to the engine shaft.

In Figs. XVI and XXVI inclusive, I have shown a modified form of my invention.

In this form of my invention, the engine 20 having the crankshaft 21 is connected to the dynamo 48, through the universal joint 31 and the overrunning clutch comprising the male clutch member 38 and the female clutch member 40, in substantially the same manner as in the preferred form of my device.

In this form of my invention, however, I have shown a different means for impressing a thrust in the desired direction on the engine shaft. A post 150 is mounted on a base 151, the post being provided with a lateral bend 159, in line with the engine shaft. A bracket 152, having a split hub embracing the post 150, the parts of said split being drawn together by the bolts 153, is provided with a laterally projecting arm 154, which extends upwardly and laterally from the post 150. A face plate 155 is secured to the end of the arm 154 by the bolts 156. The member 23, which is mounted on the shaft 21, as in the preferred form of my device, has the shoulder 157, which faces toward the engine, and member 23 has a cylindrical portion 158, and a threaded portion 160. A sleeve 161, provided with a shoulder 162 facing the shoulder 157, is threaded on the portion 160 of the member 23. A thrust ring 163 is mounted on the cylindrical portion 158 of the member 23 and provided with opposed annular recesses in its opposite faces, each of which recesses accommodates one of the bearing rings of an annular thrust bearing 166. The opposite bearing rings of said bearings 166 abut the shoulder 157 and the shoulder 162, so that the two annular thrust bearings are disposed between the opposed shoulders 162 and 157, and the thrust ring 163 is disposed between the two annular thrust bearings, with the result that a thrust impressed upon the thrust ring in the direction of the engine shaft will impress a thrust on the engine shaft in the desired direction. Nut 172 is threaded on the member 23 and washer 171 is disposed between said nut and the sleeve 161. The thrust ring 163 is provided with the diametrically opposite pins or trunnions 167, which are mounted and secured between the halves 168 of the yoke, which embraces the thrust ring 163. The halves 168 of said yoke are secured together by the bolts 170.

Each half 168 of the thrust yoke is provided, at its base, with a hemispherical projection 173, and, since each of the halves 168 of the yoke is provided with a similar hemispherical projection, the said projections being secured together by the bolt 174, this results in a substantially spherical part projecting from the base of the thrust yoke. This substantially spherical portion is mounted in a socket formed in the end of the arm 154 and the face plate 155, so that the lever, made up of the halves 175, secured together by the bolts 176, of which lever the yoke 168 is a part, is fulcrumed by means of the ball 173 in the socket formed in the arm 154. At the upper ends of the mating halves 175, which form this lever referred to above, are formed the substantially hemispherical portions 177, which, together, form a ball at the upper end of this lever. The link 178 has, at one end thereof, a block 179, in the interior of which is formed a socket 180, in which a block 181, having a concave seat, is seated. This socket 180 has an enlarged spherical portion, in which the spherical portion formed from the parts 177 is located, and the plug 182, having a concave face 183 is screwed into this recess, so as to abut against the spherical portion formed by the parts 177. The plug 182 has a head 184, by means of which it may be manipulated. It will be seen that this forms a ball and socket connection between the link 178 and the lever formed from the parts 175. The opposite end of the link 178 is forked having the arms 185 between which the lower end of the lever 186 extends, being pivotally connected thereto by the pin 187. The lever 186 is fulcrumed on the pin 188, which projects from the side of the post 150.

To the upper end of the post 150 is secured the bracket 190 through which the post extends, and which is secured to the post by means of the set screw 191. This bracket is provided with the two arms 192, which diverge upwardly from the post 150, as shown in Fig. XVI of the drawing. Each of these arms carries at its upper end a laterally extending pin 193, upon which the pulleys 194 are journalled. The bracket 190 is provided with the forwardly projecting portion 195, having an opening 196 therein, through which the upper end of the lever 186 extends. Yoke 197 embraces the upper end of the lever 186 and said yoke has, at each end, the laterally extending ears 198, which are connected to the flexible members or cables 200, which run over the pulleys 194, and are connected at their lower ends to the blocks 201, each provided with an elongated slot 202. The blocks 201 are each connected to one of the weights 203, as shown in Fig. XVI of the drawing.

A plurality of slots 204 are provided in the upper end of the lever 186, as illustrated in Figs. XVI and XXI of the drawing, and these slots are each provided with the notches 205 in the sides thereof. The yoke 197 is provided with a cylindrical opening 206 in one wall thereof, and with an aligned opening 207 in the opposite wall thereof, said opening 207 having the diametrically opposite notches 208 communicating therewith. A pin is provided, which fits in said yoke and has a cylindrical portion 210 adapted to fit in the opening 206, an intermediate portion 211 of diamond-shaped cross section, and a cylindrical portion 212, adapted to fit in the opening 207. The pin is provided with a head 213, by which it may be manipulated. This pin may be inserted through the aligned openings 206 and 207 of the yoke 197, and the slot 204, and then turned through 90 degrees so that its diamond-shaped portion 211 will seat in the aligned notches 205 of the lever, which are adjacent to said pin.

A lever 214, for manipulating the weights, is fulcrumed on the pin 215, extending from the portion 195 of the bracket 190, and this lever 214 extends on both sides of the post 150, as shown in Fig. XVI. The lever 214 carries the laterally extending pins 216, which are located at equal distances from the fulcrum 215, and which are disposed in the slots 202 of the blocks 201.

An arm 217 extends downwardly from one of the arms 192 of the bracket and has a head 218 provided with a plurality of notches 220. The weight manipulating lever 214 is provided with a handle 221, and a detent lever 222 is pivoted to the lever 214, by the pin 223, and is connected at 224 with the rod 225, which extends through a yoke 226, secured to the lever 214, and carries a block 227, which is adapted to engage in any one of the notches 220. By this means, the weight manipulating lever 214 may be locked against movement relative to the bracket 190 and the arms 192 carried thereby.

From the description of the parts given above, the operation of this apparatus should be very readily understood. The crankshaft 21 of the internal combustion engine 20 is connected to the dynamo-electric machine 48 through the universal joint 31 and the over-running clutch including the male member 37 and the female member 40. The engine 20 is started by sending a current from a suitable source of power through the dynamo-electric machine 48, which operates as a motor and turns the engine over so as to start the same, the power being transmitted through the friction clutch alone. The armature of the dynamo-electric machine 48 is usually of considerable size and weight so that, when the armature is revolving at the usual engine speeds, the momentum developed by the armature is considerable. In case an accident should happen to the engine 20, such as the burning out of a bearing, or the breaking of a connecting rod, or something of a similar nature, when the armature shaft of the dynamo-electric machine 48 is directly and positively connected with the engine, the momentum of the armature shaft keeps on turning the engine over, with the result that any accident occurring to the engine during the testing practically wrecks the engine. In order to avoid this difficulty, I connect the engine with the dynamo-electric machine through an over-running clutch. When the engine has been started and the operator desires to commence the test, the dynamo-electric machine is disconnected from the source of current and the rock-shaft 73 is operated, throwing the male clutch member 37 out of engagement with the female clutch member 40. Thereafter, the drive from the engine to the dynamometer is through the over-running clutch entirely. The plungers 65 mounted in the disc 52, being spring-pressed outwardly against the dogs 61, normally force said dogs into driving engagement with the ring 57, which is keyed by the keys 58 to the female clutch member 40, which latter is keyed to the dynamometer shaft. The direction of rotation of the shaft 33, which is driven from the engine shaft, is normally such as to force the dogs 61 into a stronger gripping engagement with the ring 57. If, however, the engine should stall and the dynamometer shaft should continue to revolve at a higher rate of speed than the disc 52, which is connected to the engine shaft, the dogs 61 will permit the ring 57 to slip relative to the disc 52, so that the momentum of the revolving dynamometer shaft will not drive the engine shaft. In other words, while the test is being carried on, the driving connections are such as to transmit torque from the engine shaft to the dynamometer shaft, but not to transmit torque from the dynamometer shaft to the engine shaft.

In order to test the engine accurately, it is desirable to have the dynamometer test made under conditions which approximate working conditions, and, therefore, it is necessary to have a thrust impressed upon the engine shaft, the value of which shall be determined so as to approximate the thrust on the engine shaft under working conditions. It is also desirable that this thrust shall be impressed upon the engine shaft in either direction and that the thrust may be varied. The weight 93 is of a known value and the rod 87, on which it is mounted, together with the bar 85, the pin 84 and the arm 109, form, in effect, a bell crank lever, of which the pin 84 forms the fulcrum. The length of the arm 109 is known and the distance of the point at which the weight 93 is applied to the rod 87, from the fulcrum 84, may be definitely determined. The result is that the bell crank formed by the arm 109, the pin 84 and the rod 87, has arms of definite length, and, since the weight 93 is applied to one of said arms, it exerts a force at the lower end of the arm 109, which is of definite value. The lower end of the arm 109 is connected to the upper end of the lever 113, which is fulcrumed at 112, and the lower end of the lever 113 is connected through a universal connection with one end of the lever 126, which is fulcrumed on the stud 129, projecting upwardly from the arm 79. The forked end 130 of the lever 126 engages the pins 131 of the thrust ring 132, which is mounted on the member 23, fixed to the engine crank shaft 21, and between the annular thrust bearings 134. One of these thrust bearings is mounted so as to abut a fixed shoulder 238 on the member 23, and the other thrust bearing is mounted so as to abut a fixed shoulder 136 on the sleeve 137, which is threaded on and fixed to the member 23, so that, in effect, the annular thrust bearings 134 abut a pair of opposed and facing shoulders on the engine crank shaft 21. The thrust ring 132 is mounted between said annular thrust bearings, so that it may exert a thrust against either one of said bearings, and, as heretofore described, the weight 93 exerts a definite force on the upper end of the lever 113, and thus the lower end of said lever 113 exerts a definite force upon the lever 126, and, since the other end of the lever 126 is connected to the thrust ring, a definite force is exerted by the weight 93 upon the thrust ring in a line coincident with the axis of the engine shaft.

The force exerted by the lever 126 on the thrust ring 132 is such that the thrust ring exerts a thrust on the engine shaft in a line coincident with the axis of the engine shaft. The direction in which the thrust will be impressed upon the engine shaft depends upon the position of the weight 93 on the rod 87. In Fig. 1 of the drawing, the weight 93 will tend to move the lower end of the arm 109 to the right in Fig. 1. This will tend to move the lower end of the lever 113 to the left in Fig. 1. This will tend to move the end of the lever 126, which is connected to the lever 113, to the left in Fig. 1, and the thrust exerted on the thrust ring and hence on the engine shaft will be in the direction toward the engine. If the weight 93 is moved on the rod 87, so that it is disposed on that portion of the rod, which is on the opposite side of the fulcrum 84, the forces will be exerted in opposite directions, and the thrust exerted on the thrust ring, and hence on the engine shaft, will be impressed on the shaft in a direction away from the engine. It will be seen, therefore, that, by means of this apparatus, I have provided means for impressing a predetermined thrust on the engine shaft, and I have also provided means whereby the direction of application of this thrust to the engine shaft may be reversed.

Referring to Fig. XV of the drawing, it will be seen that a plurality of openings 97 are provided in the rod 87. The yoke 90, which carries the weight 93, may be shifted on the rod 87 by depressing the lever 100 and withdrawing the plunger 104 from the opening 97 in which it is disposed. This plunger serves as a detent to prevent movement of the yoke, and hence of the weight, relative to the rod 87, or in other words, it serves to prevent inadvertent varying of the length of the lever arm to which the weight is attached. By shifting the yoke 90 on the rod 87, and engaging the plunger 104 in any one of the openings 97 provided therein, the length of the lever arm to which the weight is attached, may be varied, and, therefore, the value of the thrust, which is impressed on the engine shaft, may be varied, since the value of this thrust is dependent upon the length of this lever arm. It will therefore appear that I have provided means for impressing a predetermined thrust upon the engine shaft, and means for varying the amount of thrust which is impressed upon the engine shaft.

Referring to Figs. XVI and XXVI, inclusive, it will be seen that I have shown a modification of this apparatus, which works on practically the same principle and secures the same results. In this modification of my invention, the engine 20 is connected to the dynamo 48, through the universal joint 31 and the over-running clutch 40, in the same way as in the preferred form of my apparatus.

Annular thrust bearings 166 are arranged on the member 23, secured to the shaft 21 substantially as in the preferred form, and the thrust ring 163 is mounted on said member between the annular thrust bearings, so that this thrust ring may exert a thrust on either one of said thrust bearings. The pins 167, which extend from the thrust ring 163 at diametrically opposite points, are secured in and connected to the lever 175, having a yoke portion 168 embracing the thrust ring, and fulcrumed at its lower end in the fixed arm 154, by means of the ball formed by the parts 173, which is mounted in a socket formed in the arm 154. The upper end of the lever 175 is connected to the lower end of the lever 186 by a link 178, which has a ball and socket connection with the upper end of the lever 175, to permit entire freedom of movement of the link 178 relative to the lever 175.

With the parts in the position shown in Fig. XVI, no thrust will be impressed upon the thrust ring, since both of the weights 203 are supported by the pins 216 projecting from the weight manipulating lever 214. Should the detent lever 222 be manipulated to withdraw the latch 227 from the central notch 220, in which it is disposed, and the lever 214 be moved so that the latch 227 is disposed in the lower end of the notches 220, the result will be that the weight 203, shown at the right in Fig. XVI will be entirely supported by the pin 216 projecting from the lever 214, and extending through the notch 202. On the other hand, the left hand weight 203 will not be supported by the lever 214 at all, but will be supported through its connection with the ear 198 of the yoke 197, through the cable 200 passing over the pulley 193. This yoke 197 is connected to the upper end of the lever 186 through the pin 211, which extends through the yoke and is connected in the slot 204 formed in the upper end of the lever. The weight 203, at the left hand side in Fig. XVI, will therefore exert a force on the upper end of the lever 186, which will tend to move the upper end thereof toward the left in Fig. XVI, and consequently the lower end of the lever will tend to move to the right. This will tend to move the lever 175 to the right, and will impress a thrust upon the thrust ring 163, and consequently upon the engine shaft, in a direction toward the engine. If now, the weight manipulating lever 214 is operated so that the detent latch 227 is engaged in the uppermost of the notches 220, the left hand weight 203 will be supported by the lever, while the right hand weight will not be supported thereby and will exert a force on the upper end of the lever 186 through the cable 200, the yoke 197 and the pin 211, which will tend to move the upper end of the lever 186 to the right in Fig. XVI, and the lower end of said lever to the left, and, consequently, the upper end of the lever 175 will tend to move toward the left and a thrust will be impressed upon the thrust ring 163, and hence upon the engine shaft, in a direction away from the engine.

It will be seen that, by this means, I have provided for impressing a thrust of a predetermined value upon the engine shaft, since the thrust which is impressed upon the engine shaft is determined by the length of the lever 175, and the length of the lever arm 186 from the fulcrum 188 to the point where the yoke 197 is connected to the lever, together with the amount of the weight 203. Each of the weights 203 will impress the same thrust upon the engine crankshaft, and the direction of the thrust which is impressed upon the crankshaft is reversed by manipulating the lever 214, so as to support one of the weights and not support the other, as I have already pointed out. Yoke 197 is connected to the lever 186 through the pin 211, the cylindrical portions 210 and 212 of which are journaled in the openings 206 and 207 of the yoke, while the pin is turned so that the corners of the diamond-shaped portions 211 engage in opposite notches 205 formed in the sides of the slots 204, in the upper end of the lever 186. The pin 211 may be turned by manipulating the head 213, through an angle of ninety degrees, so as to carry the corners thereof out of the notches 205 and the pin can then be withdrawn through the opening 207, which, due to the notches 208, permits the diamond-shaped portion of the pin to pass therethrough. The bracket 190, which carries the arms 192 and the pulleys 193, and all of the weight supporting mechanism, may then be adjusted on the post 150, by releasing the set screw 191, so as to bring the yoke 197 in line either with another one of the slots 204 or with another pair of notches 205, and the yoke may be again connected, in this new position, with the lever 186 through the pin 211, which is inserted through the opening 207 and turned at right angles to bring the corners of the diamond-shaped portion 211 into engagement with the notches 205. I have shown three slots 204, each of said slots having three pairs of notches 205, and it will be observed that this gives nine different positions at which the yoke 197 may be connected to the lever 186. In other words, there are nine different points at which the weight, or rather the force exerted by the weight, may be applied to the upper end of the lever 186, so that there are nine different lengths of lever arms on which this force acts. The weight 203 is of a known value and the force, which it exerts on the upper end of the lever 188, is known. The force, which is exerted by the lower end of the lever 186, depends on the distance between the fulcrum 188 and the point at which the yoke 197 is connected to the upper end of the lever 186, and hence, by means of these different points at which the yoke may be connected, the thrust exerted by the weight may be varied.

It will be observed that in both forms of my device, I have, in the first place, provided means for impressing a predetermined thrust upon the engine crankshaft in a direction axially of the engine crank shaft. In the second place, I have provided means by which this thrust may be varied, so that the value of the thrust which is impressed upon the crank shaft may be changed and a thrust of any one of a number of predetermined values may be impressed upon the crank shaft. In the third place, I have provided means whereby this thrust may be impressed upon the crank shaft, either in the direction toward the engine or away from the engine, or, if desired, the engine may first be tested with a thrust impressed in one direction, and then the direction of application of the thrust may be reversed so that the engine may be tested with the thrust applied both towards the engine and away from it.

In this apparatus I have also provided a driving connection between the engine and the dynamometer shaft, for use while the test is being conducted, of such a nature that torque is transmitted only from the engine to the dynamometer shaft and the torque generated by the momentum of the revolving armature cannot be transmitted to the engine shaft. As I have already pointed out, this is important because otherwise there would be very grave danger of wrecking the engine, in case it should stall, due to the momentum of the revolving armature shaft. I have also provided supplemental clutch connections so that there may be a positive drive between the engine and the dynamometer shaft for use in starting the engine.

By means of the apparatus described in this specification, I have provided a means for testing engines, which is especially applicable to engines designed for aeroplane use in which it is necessary to test the engine with a thrust applied thereto. So far as I am aware, no testing apparatus has heretofore been devised, in which means was provided for placing a thrust on the crank shaft of the engine while being tested.

I am aware that the particular embodiment of my invention, which I have here shown and described, is susceptible of considerable variation without departing from the spirit thereof, and, therefore, I desire to claim my invention broadly, as well as specifically, as indicated by the appended claims.

Having thus described my invention, what I claim as new and desire to secure by Letters Patent, is:

1. In an apparatus for testing mechanisms, a rotary element, a power testing apparatus, driving connections between said element and said power testing apparatus, and means for placing a predetermined thrust on said rotary element in either of two directions.

2. In an apparatus for testing mechanisms, a rotating member, a power testing apparatus, driving connections between said member and said apparatus including an over-running clutch, and means for placing a predetermined thrust on said rotating member.

3. In an apparatus of the class described, a rotating member, a power testing apparatus, driving connections between said member and said apparatus including an over-running clutch, means for placing a predetermined thrust on said rotating member, and means for reversing the direction of said thrust.

4. In an apparatus for testing mechanisms including a shaft, a power testing apparatus, driving connections between said shaft and apparatus including an over-running clutch, means for placing a predetermined thrust on said shaft, and means for varying the amount of said thrust.

5. In an apparatus for testing mechanisms including a shaft, a power testing apparatus, driving connections between said shaft and said apparatus, a member mounted on said shaft and having opposing abutments, a pair of annular bearings mounted on said member between said abutments, a thrust ring interposed between said annular bearings, and means for applying a predetermined thrust to said thrust ring.

6. In an apparatus for testing mechanisms, a shaft, a power testing apparatus, driving connections between said shaft and said apparatus, a member mounted on said shaft and having opposite abutments, a pair of annular bearings mounted on said member between said abutments, a thrust ring interposed between said annular bearings, means for applying a predetermined thrust to said thrust ring, and means for reversing the direction of said thrust.

7. In an apparatus for testing mechanisms, a shaft, a power testing apparatus, driving connections between said shaft and said apparatus, a member mounted on said shaft and having opposite abutments, a pair of annular bearings mounted on said member between said abutments, a thrust ring interposed between said annular bearings, means for applying a predetermined thrust to said thrust ring, and means for varying the amount of said thrust.

8. In an apparatus for testing mechanisms including a shaft, a power testing apparatus, driving connections between said shaft and said apparatus, a member mounted on said shaft and having opposite annular abutments, a pair of annular bearings mounted on said member one of said bearings engaging each of said abutments, a thrust ring mounted between said annular bearings, a suitably fulcrumed lever engaging said thrust ring, and means for applying a predetermined force to said lever.

9. In an apparatus for testing mechanisms, a shaft, a power testing apparatus, driving connections between said shaft and said apparatus, a member mounted on said shaft and having opposite annular abutments, a pair of annular bearings mounted on said member, one of said bearings engaging each of said abutments, a thrust ring mounted between said annular bearings, a suitably fulcrumed lever engaging said thrust ring, means for applying a predetermined force to said lever, and means for reversing the direction of application of said force.

10. In an apparatus for testing mechanisms, a shaft, a power testing apparatus, driving connections between said shaft and said apparatus, a member mounted on said shaft and having opposite annular abutments, a pair of annular bearings mounted on said member, one of said bearings engaging each of said abutments, a thrust ring mounted between said annular bearings, a suitably fulcrumed lever engaging said thrust ring, means for applying a predetermined force to said lever, and means for varying the amount of said force.

11. In an apparatus for testing mechanisms including a shaft, a power testing apparatus, driving connections between said shaft and said apparatus, a member mounted on said shaft and having opposite abutments, a thrust ring disposed between said abutments, and means for applying a predetermined thrust on either one of said abutments including a system of levers and means for applying a predetermined force to said system of levers.

12. In an apparatus for testing mechanisms including a shaft, a power testing apparatus, driving connections between said shaft and said apparatus, a member mounted upon said shaft and having opposite abutments, a thrust ring disposed between said abutments, means for applying a predetermined thrust to either one of said abutments including a system of levers, means for applying a predetermined force to said system of levers, and means for reversing the direction of application of said force.

13. In an apparatus for testing mechanisms, a shaft, a power testing apparatus, driving connections between said shaft and said apparatus, a member mounted on said shaft, and having opposite abutments, a thrust ring disposed between said abutments, means for applying a predetermined thrust on either one of said abutments including a system of levers, means for applying a predetermined force to said system of levers, and means for varying the amount of said force.

14. In an apparatus for testing engines, a dynamometer, a driving connection between the engine and the dynamometer operable to transmit torque only from the engine to the dynamometer, a supplemental positive driving connection between said engine and said dynamometer, and means for releasing said supplemental driving connection.

15. In an apparatus for testing engines, a dynamometer, a driving connection between the engine and the dynamometer including an over-running clutch connecting the engine and dynamometer and operable to transmit torque only from the engine to the dynamometer, and a friction clutch positively connecting said engine to said dynamometer.

16. In an apparatus for testing power transmitting mechanisms, a dynamometer, a driving connection between said power transmitting mechanism and said dynamometer operable to transmit torque in one direction only, and a supplemental driving connection between said power transmitting mechanism and said dynamometer operable to transmit torque upon rotation in either direction, and means for releasing said last named connection.

17. In an apparatus for testing mechanisms including a rotating element, and means for applying a predetermined thrust upon said rotating element in either direction axially thereof during the rotation of said element.

18. In an apparatus for testing mechanisms including a shaft, means for applying a varying thrust upon said shaft in either direction axially thereof and during the rotation of the shaft.

19. In an apparatus for testing mechanisms, a rotatable element, and means for applying a predetermined thrust upon said element in either direction axially thereof, and means for varying the thrust as desired.

20. In an apparatus for testing mechanisms, a shaft, a member carried by the shaft and provided with anti-friction devices, and means for applying a predetermined force to said member whereby a thrust is impressed upon the shaft in a direction axially thereof.

21. In an apparatus for testing mechanisms, a rotatable shaft, a member carried thereby, a pivoted lever, a weight cooperating with said lever, means connecting the member to the lever whereby a predetermined thrust is impressed upon the rotatable shaft in a direction axially thereof, and means for varying the direction of the thrust.

22. In an apparatus for testing mechanisms including a shaft, a member carried by the shaft, a pivoted lever, a fulcrum for said lever, means for transmitting force from one arm of the pivoted lever to said member, means upon the other arm of said lever for exerting a pull thereon whereby a thrust is applied to said shaft in a direction axially thereof.

23. In an apparatus for testing mechanisms, a rotatable element, and means for applying a predetermined thrust to said rotatable element in either direction axially thereof during rotation of the element, or changing, or removing the thrust during the rotation of the element.

24. In an apparatus for testing mechanisms including a shaft, a thrust collar for impressing a thrust upon the shaft in a direction axially thereof, a pivoted lever, and means including a universal connection for applying force to the thrust collar from the pivoted lever in such a manner as to permit the thrust collar to be maintained in a position at right angles to the shaft under the influence of the force applied thereto.

25. In an apparatus for testing mechanisms, a shaft, a driven mechanism, driving connections between said shaft and said mechanism comprising a universal joint, and means for applying a thrust to said shaft in a direction axially thereof.

26. In an apparatus for testing mechanisms, a shaft, a driven mechanism, driving connections between said shaft and said mechanism comprising a universal joint and an over-running clutch, and means for applying a thrust to said shaft in a direction axially thereof.

27. In an apparatus for testing mechanisms including a shaft, a driven mechanism, and driving connections between said shaft and said driven mechanism comprising a universal joint and operable to transmit force in one direction only from the shaft means to the driven mechanism.

28. In an apparatus for testing mechanisms including a shaft, a driven mechanism, and driving connections between said shaft and said driven mechanism including a universal joint and an over-running clutch.

29. In an apparatus for testing mechanisms, a non-compressible shaft, a driven mechanism, driving connections between the shaft and driven mechanism, and means operable independently of the rotation of the shaft for applying a thrust to the shaft in a direction axially thereof.

30. In an apparatus for applying thrust to a rotatable element, an offset arm, a lever pivotally secured to said offset arm, means associated with said lever for applying thrust to the rotatable element, and means for determining the amount of thrust to be applied.

31. In an apparatus for applying thrust to a rotatable element, a fixed base, an arm offset therefrom, a lever pivotally mounted upon said arm, and means associated with said lever for applying thrust to the rotatable element.

32. In an apparatus for applying thrust to a rotatable element, a pivotally mounted lever provided with means adapted to circumferentially engage the rotatable element, and means for applying force to said lever whereby a predetermined thrust may be applied to said rotatable element through said engaging means.

33. In an apparatus for applying thrust to a rotatable element, a member adapted to circumferentially engage the rotatable element, and means for applying force to said engaging means whereby a predetermined thrust may be applied to said rotatable element.

34. In an apparatus for applying thrust to a rotatable element, a member adapted to circumferentially engage the rotatable element, means for applying force to said engaging means whereby thrust may be applied to said rotatable element and means for varying the amount of the thrust.

35. In an apparatus for applying thrust to a rotatable element, a member adapted to engage the rotatable element, a pivoted lever operatively connected with said member, and means for applying force to said lever whereby thrust is communicated to said rotatable element from said member.

36. In an apparatus for applying thrust to a rotatable element, an upright standard, a pivoted lever provided with means adapted to engage the rotatable element and means supported by said standard for communicating force to said lever whereby thrust may be applied to said rotatable element.

37. In an apparatus for applying thrust to a rotatable element, a support, a pivoted lever carried by said support and provided with means adapted to engage the rotatable element, and means carried by said support for communicating force to said lever whereby thrust may be applied to the rotatable element.

38. In an apparatus for applying thrust to a rotatable element, a support, a pivoted lever provided with means for engaging the rotatable element, means for applying force to said lever, and means for reversing the direction of the applied force.

39. In an apparatus for applying thrust to a rotatable element, a support, a pivoted lever provided with means for engaging the rotatable element, means for applying force to said lever in either of two directions, and means for preventing the application of force thereto.

40. In an engine testing apparatus, means for measuring the power delivered by an engine and means for varying the end thrust imposed upon the shaft of the engine.

41. In an engine testing apparatus, a dynamometer adapted to be connected to the shaft of an engine and means for imposing a predetermined end thrust upon said shaft.

42. In a device for measuring the power developed by an engine, a shaft adapted to be operatively connected with the drive shaft of said engine, a dynamometer operatively connected with said shaft and means independent of said dynamometer for imposing a predetermined end thrust upon said drive shaft.

43. In a device for measuring the power developed by an engine, a dynamometer, a shaft, a clutch connecting said dynamometer and shaft, a second shaft having a splined engagement with said first shaft to permit relative longitudinal movement thereof and adapted to engage the shaft of an engine to be tested, an anti-friction device on said second shaft and means for subjecting said anti-friction device to pressure to produce a predetermined end thrust in said engine shaft.

In testimony whereof, I affix my signature.

WILLIAM R. McCULLA.

Certificate of Correction.

It is hereby certified that in Letters Patent No. 1,427,218, granted August 29, 1922, upon the application of William R. McCulla, of Toledo, Ohio, for an improvement in "Engine-Testing Apparatus," errors appear in the printed specification requiring correction as follows: Page 4, lines 10 and 11, strike out the words "similar in all respects to the bearing described above" and insert the same to follow the word "bearing" in line 9; page 10, line 46, claim 27, strike out the word "means" and insert the same to follow the word "and" in line 44; and that the said Letters Patent should be read with these corrections therein that the same may conform to the record of the case in the Patent Office.

Signed and sealed this 10th day of October, A. D., 1922.

[SEAL.]
WM. A. KINNAN,
*Assistant Commissioner of Patents.*